United States Patent
Rigby et al.

(10) Patent No.: US 6,524,546 B2
(45) Date of Patent: Feb. 25, 2003

(54) PROCESS FOR MAKING CALCIUM CHLORIDES

(75) Inventors: William J. Rigby, Naperville, IL (US);
Keith D. Cochran, Killen, AL (US);
Timothy G. Holt, Florence, AL (US)

(73) Assignee: Willaim J. Rigbv, Naperville, IL (US)

( * ) Notice: Subject to any disclaimer, the term of this patent is extended or adjusted under 35 U.S.C. 154(b) by 0 days.

(21) Appl. No.: 10/000,410

(22) Filed: Nov. 2, 2001

(65) Prior Publication Data

US 2002/0076375 A1 Jun. 20, 2002

Related U.S. Application Data (63) Continuation-in-part of application No. 09/100,994, filed on Jun. 28, 1998, now Pat. No. 6,365,122.

(51) Int. Cl.[7] .............................. C01B 9/00; C01B 9/02; C01B 9/04; C01B 9/08
(52) U.S. Cl. ...................... 423/491; 423/103; 423/147; 423/163; 423/197; 423/489; 423/490; 423/493; 423/498; 423/499.4
(58) Field of Search ........................ 423/99, 101, 103, 423/138, 147, 155, 163, 179, 197, 462, 489, 490, 491, 493, 497, 498, 499.1, 499.4; 422/139, 140, 141, 143, 144, 145

(56) References Cited

U.S. PATENT DOCUMENTS

| | | |
|---|---|---|
| 1,500,289 A | 7/1924 | Webber |
| 3,563,701 A | 2/1971 | Cannon |
| 3,717,440 A | 2/1973 | Cannon |
| 3,907,971 A * | 9/1975 | Bohm et al. ............. 423/240 S |
| 3,975,283 A * | 8/1976 | Braithwaite et al. ...... 23/293 A |
| 4,301,137 A * | 11/1981 | Williams et al. ............. 210/2.5 |
| 4,652,434 A * | 3/1987 | Bonsack et al. ............ 423/137 |

OTHER PUBLICATIONS

Derwent–ACC–NO: 1991–354373 (Abstract of CA 2038021 A), 1991.*

* cited by examiner

Primary Examiner—Stanley S. Silverman
Assistant Examiner—Eileen E. Nave (57) ABSTRACT

A new process for producing calcium chloride and other metal halides from the carbonates, bicarbonates, oxides of these metals. The process utilizes the discovery that hydrogen halides, when used in a true or conventional fluidizing medium in shallow beds of the aforementioned solids at moderately elevated temperatures in a continuous counter current process results in the conversion of the metal carbonates, bicarbonates, and oxides, into metal halides and carbon dioxide gas and/or water vapor. The process is carried out in a series of true or conventional fluidized beds preferable but not necessarily arranged in a vertical configuration so that the solids flow downward due to the fluidized process and the hydrogen halides flow counter currently in an upward direction producing metal halides at the bottom and pure carbon dioxide gas and/or water vapor at the top.

20 Claims, 3 Drawing Sheets

PROCESS FOR MAKING CALCIUM CHLORIDES

RELATED APPLICATIONS

This is a continuation-in-part to application Ser. No. 09/100,994 filed Jun. 28, 1998, now U.S. Pat. No. 6,365,122 B1.

FIELD OF THE INVENTION

This invention relates to a continuous process for the reaction of solid metal carbonates, bicarbonates and oxides with a hydrogen halide gas in a true fluidized state with the production of a solid having a composition composed of the metal and the halide ion. The invention relates more particularly to the manufacture of calcium chloride, magnesium chloride, zinc chloride and chlorides of iron in an energy efficient non-aqueous medium using conventional or true fluidized bed technology and counter current flow generally but not exclusively between the solid flowing downward by gravity and the upward moving gas. The process is unique in that it is basically self-controlling, that is, the feed rate of the solids and gas and the design of the vessel control the production rate and degree of conversion of the solids. No elaborate controls are required, little or no recycling of reaction gas or product are necessary since the counter current aspect of the process is such that complete conversion of the solid is achieved, the exiting gas is essentially free of the hydrogen halide component of the feed gas, and the particle size of the product remains essentially the same as the original solid feed, although some finer particles are produced.

BACKGROUND OF THE INVENTION

Halogens, with some exceptions, chemically behave generally in the same manner. The reactions of hydrochloric acid therefore are similar in many respects to those of the acids of the other halogens. Anhydrous hydrogen chloride is relatively inert because of the high kinetic barrier to fission of the H—Cl bond. Anhydrous hydrogen chloride however has an extremely high affinity for water, even if the water is in the vapor or gaseous state, which was demonstrated as early as 1860 by William Odling and reported in Vol. 1 of "The Chemical News". This is very important when the reactions in this teaching are considered. It is contemplated that the industrial gases employed in the teaching will not be anhydrous and will contain some water vapor and therefore will be significantly more reactive because of the effect of this moisture on assisting the fission of the H–Cl bond. In addition when these acid reactions proceed, water, whether gas or vapor, will be liberated and increase the reaction rate.

The reaction of the metal compounds in the instant invention all produce water in the gaseous or vapor phase and because the reactions are exothermic and the heat exchange between solid and gas in a true or conventional fluidized bed is very efficient, condensation of this water is substantially unlikely in the process to be described.

RELATED ART

For many years calcium chloride was primarily produced as a by-product of soda ash manufacture by the Solvay Process. In this process the recovery of ($NH_3$) Ammonia from the process liquors containing ammonium chloride is economically essential. This is accomplished by adding milk of lime $Ca(OH)_2$ to the process liquors thereby producing calcium chloride.

The calcium chloride liquors were then clarified, concentrated by evaporation, crystallized and melted to produce flake calcium chloride. With the demise of soda ash production by the Solvay Process in the USA, due to the mining of the Trona in Wyoming, significant production of calcium chloride was lost. The last remaining Solvay Process plant in North America at Amherstburg, Ontario in Canada has now been shut down for the same reason. Large tonnage is also produced through recovery from saline solutions by the Dow Chemical Companies in Michigan.

A significant percentage of USA production has now been replaced by the reaction of hydrochloric acid with calcium carbonate to produce a calcium chloride solution. The solutions produced require concentration by evaporation and crystallization processes to produce crystals of calcium chloride and melting (782° C.) of the crystals to produce flake calcium chloride. Both of these operations are energy and capital intensive which in a rising energy-cost environment significantly increases the cost of production. The hydrochloric acid is produced in large quantities as a byproduct from chlorinated hydrocarbon production and off gases from chlorine production and other operations.

Loots and Van Goftberg teach in Canadian patent CA 2,038,021 three methods for producing calcium chloride, two of which are identical in almost all respects, from anhydrous gases containing hydrogen chloride, chlorine, and mixtures of these gases. The first method consists of a number of fixed beds of $CaCO_3$, or $Ca(OH)_2$ or CaO in series and through which the anhydrous gas or mixture of anhydrous gases are passed for a period of time until the conversion to calcium chloride is complete in the first bed in the series. This bed is then removed from the series to be unloaded and recharged, while the next bed in the series becomes the first in the series. While the discussion of the process indicates that it is possible in principle for reaction (page 1, line 10) $CaO+HCl \rightarrow CaCl_2+H_2O$ to proceed at gas and bed ambient temperature, the inventors then state that (page 2, line 20) it will not be possible to achieve the desired bed temperatures under these conditions, which leads one to the conclusion that the reaction will not proceed without heat input to the bed and gas. Since reaction (1) outlined in the teaching has thermodynamically the highest $\Delta H$ it is also presumed that none of the other reactions involving anhydrous hydrogen chloride $(HCl)_g$ or chlorine $(Cl_2)_g$ with calcium hydroxide $(Ca(OH)_2)$ or calcium carbonate $CaCO_3$ will proceed at ambient temperature. Some of the major disadvantages of this process are that significant labor would be required to load and unload the reactors with raw materials and finished product. It was disclosed on page 7, lines 27–28 that for the calcium carbonate hydrogen chloride test that the finished product was a hard plug which required crushing. This is a major disadvantage since removal from a commercial vessel would require significant labor and crushing would produce large amounts of undesirable fines.

Another disadvantage is that the higher-pressure drop across the bed requires more energy to increase the gas pressures. In addition, more expensive, heavier walled vessels are required because of the higher pressure, increasing the capital investment.

A further disadvantage is determining when full conversion to calcium chloride is attained since the product is contained in a closed pressurized vessel. Still another disadvantage is that a large number of vessels are required to insure continuous operation while one or more vessels are being loaded and unloaded, adding considerably to capital cost.

Two additional embodiments of the Loots and Van Gottberg invention both somewhat alike and described as a "fluidized bed", teach a process in which either calcium carbonate, oxide, or hydroxide are contained in a reaction vessel or riser and reacted with hydrochloric acid and or chlorine from which the spent gas and the finished calcium chloride (entrained in the gas stream) is withdrawn. A cyclone or other separating devise is employed to remove the finished product from the gas. Part of the gas stream is recycled to provide reheat to the feed gas. Particle size is in the rage of 50 to 300 microns. This is a very fine product that has little or no commercial value and requires melting (782° C.) and flaking or prilling if it is to be sold as a solid. Significant capital investment and energy use is required to accomplish this by way of high-pressure steam generation and flakers or prill towers.

Both processes are described as a "fluidized process", a term which is often used to describe spouting beds similar to those produced in a "Wurster" type apparatus or a fast moving gas stream containing or conveying entrained solids, or to describe a dense phase gas agitated bed in a state of substantial fluidity. While these may fall under the generic term "fluidized" they are not true or conventional fluidized beds. In a conventional or true fluidized bed the solid particles are kept in a randomly moving fluidized condition by a stream of pressurized gas, which is forced through perforations of a support plate, causing the solid particles to move in a random bubbling fashion similar to a gently boiling liquid. These conditions permit the solids to flow and act like liquids and maintain a level like liquids. In U.S. Pat. No. 5,399,186; Mar. 21, 1995; column 4, line 44, Darrah et. al., go to some length to distinguish true or conventional fluidization as used in their teaching from the various types noted above. In U.S. Pat. No. 4,495,163; Jan. 22, 1985; column 3, line 34, Nguyen found it necessary to define fluidized beds generically to distinguish his teaching as follows, "The term fluidized bed as used herein is intended to include conventional fluid beds, fast moving fluid transport systems wherein the pellets are carried in the gas stream separated and returned to a point of introduction, spouting beds, etc." It is important to emphasize this distinction since true or conventional fluidization causes the solids to flow and act like liquids.

True fluidization as used in the instant invention is that which meets the definition outlined in the Darrah patent, which permits a continuous operation, the use of counter current gas and solid flows, which results in the production of high purity finished product, retention of crystal integrity, rapid conversion rates, simplicity of the apparatus, very efficient energy conservation, the elimination of environmentally controlled emissions and minimum capital investment. It excludes spouting beds, dense phase gas agitated beds, allutriated zones or fast moving transport or solid conveying systems since using such means other than that described as conventional or true fluidization will not accomplish the results described in the inventive process.

Operation of the process as described as the second embodiment (FIG. 2, reference 100) is somewhat unclear and as will be shown in a later discussion does not appear amenable to producing an effluent gas without HCl or $Cl_2$ contamination or a finished product completely converted to calcium chloride. It is also very unclear as to how the inventors intended the process to operate. They apply various meanings to the word "fluidize" so that it is difficult to know precisely what is meant when the word is used. For example, on page 3 lines 18 to 25 there is no distinction made between a "fluidized bed" in a reaction vessel and "withdrawing an overhead stream containing spent gas and entrained calcium chloride particles". Both of these processes cannot be performed at the same time since the latter actions (gas conveying) requires much higher gas velocities than true fluidization. Data provided by the inventors page 20, lines 1 to 6 clearly show this. Page 11, line 15 outlines an experiment in which a so called "fluidized bed"was simulated using small particles and a gas velocity of 3 m/sec which is a conveying velocity according to the inventors definition and which cannot fit the classical definition of a fluidized bed. Furthermore the inventors in page 21, lines 4 and 5 equate a gas with entrained solids with fluidization as follows "through which solid particles in fluidized or entrained form can pass".

FIG. 2 (reference 100) depicts a bed of particles described as being fluidized yet there is shown only a single gas entry, no perforated support plate or gas plenum is shown. The apparatus description does not include these essential elements for true fluidization so that it appears that the bed is not a true or conventional fluidized bed but a dense phase gas agitated bed. This conclusion is supported by the contradictory descriptions on page 10 (see lines 1, 2, and 9–11) that "an overhead stream comprising spent gas and calcium chloride particles exit the top of the vessel 102 since it is not possible to concurrently maintain either a true fluidized bed or a gas agitated bed with a gas velocity high enough to carry the particles out of the vessel.

The only process operation that supports the descriptions outlined is a batch process composed of a dense phase gas agitated bed of particles maintained in a state of minimum fluidity and which are contacted by the reactive gases for a long period of time after which the gas velocity is greatly increased to vacate the vessel. The vessel would then be recharged through the venturi mechanism depicted. There are many serious disadvantages to this process including environmental degradation and substantial capital investment as will be described following the discussion of the third embodiment of the process. If the so-called "fluidized" bed is intended to be a spouting bed or a circulating bed the same conditions as previously described will exist.

The drawings and description for the third embodiment of the invention depicts a vertical vessel or riser containing solids into which gas is injected and which are maintained in what one would describe as a spouting bed i.e. the particles are suspended or entrained (page 10, lines 10 to 15) in the gas stream such that the particles are carried up the riser and returned to the bottom of the vessel. FIG. 3 designated as 200 appears to clearly depict this. The description which is extremely vague gives little or no indication of the intended process, except that the statement in lines 29 to 31 of page 20 indicates that "those elements of the process using the same numerals in the third embodiment as in the second embodiment, are the same". This leads one to conclude that the apparatus and operation with minor exceptions are the same since the vessel and collection device have the same numerals as the second embodiment. If however the bed is a spouting bed then the gas stream entering the "V" shaped bottom would project the particles into the vessel somewhat like a fountain while the returned particles would follow the sides down to the gas injection point to be projected back into the center portion of the vessel. This is a typical spouting bed rather than a true or conventional fluidized bed. The inventors were obviously aware of this distinction since their description of the fluidization in the heat exchange section 202 feeding the vessel as "a low velocity bubbling bed of particles of gas as fluidizing medium" (p. 21 line 4,9) is typical of true or conventional fluidization.

This description is not applied to either of the two embodiments or the process within the reactor vessel and the fact that the product is removed by gas conveyance out the top of the vessel clearly demonstrates that true or conventional fluidization with its advantages which will be described in the inventive process were not contemplated in this teaching. It is also difficult to determine how the inventors contemplate the process to work since it is not explicitly described. For example, if the spouting bed of particles is retained in the vessel to achieve at least 71–84% yield, it must be retained up to two hours (page 7, line 28) using very fine particles less than 10 microns for reaction 3 ($HCl_g+CaCO_3$) before the bed is then conveyed to the collection system by a higher velocity gas. During this time frame reaction gas continues to leave the system through the purge orifice and at least in the mid to later stages of the process must contain significant un-reacted HCl and or $Cl_2$ gas due to the lower chloride concentration gradient between the partially reacted product and the gas. The purge gas which will create a serious environment hazard (HCl or $Cl_2$) must be cleaned up before releasing inert gases (air and/or $CO_2$ from the reaction) to the atmosphere adding substantial capital cost to the process.

The process in both of these embodiments appears to be essentially batch processes, that is the bed of solids are fed into the reactor and retained in the reactor for some period of time, while being subjected to a gas containing the reacting medium, until the reaction is close to completion. The product must then be ejected from the vessel by a much higher velocity gas, which must be purged from the system. The inventors appear to have contemplated this mode of operation since on page 20, lines 1–6 they computed the gas velocity needed for so-called "fluidization" for particles less than 10 and 15 microns and for "carrying velocity".

If on the other hand the process is operated on a continuous basis with raw material being fed into the apparatus, and finished product being removed continuously, then because of the inherent inefficiency of a spouting bed process operated in a continuous fashion and the time required to completely convert the product, the finished product will contain a relatively high percentage of unconverted raw feed and the purge gas a higher percentage of feed gas components. The finished product would of course be a homogeneous blend of unreacted and reacted solids and the purge gas a blend of reacted and unreacted gases. It is obvious from the computations reported (page 20 lines 14–19) that the inventors anticipated a relatively high percentage (up to 10%) of un-reacted calcium carbonate in the finished product of both described "fluidized processes".

If the so-called "fluidization process are batch rather than continuous they cannot be combined with any other continuous operation producing hydrogen chloride and or chlorine gas unless there are multiple units of the process in operation, so that there is always a unit available to accept gas from the producer of the hydrogen chloride and or chlorine. This is a serious deficiency adding considerable capital cost to any commercial installations.

If on the other hand the solids are entrained by the gas stream in the vessel with part of the feed circulated and part recovered as finished product then the process could be operated in a continuous manner as previously shown but with the serious deficiency of low quality finished product (high percent of initial product) and serious environmental issues (removal of HCl and or $Cl_2$ from purge gas). None of these disadvantages exist in the inventive process due to the use of true fluidization and counter current flow of gas and solids in a continuous process.

The instant invention also eliminates all of the previously outlined disadvantages of the fixed bed embodiment of the Loots and Van Gottberg invention in that the inventive process is continuous and eliminates loading and unloading fixed reactor beds with their attendant high labor cost. Efficient heat exchange between gas and solid effectively uses the heat liberated in the exothermic reaction which together with true fluidization maintains gas and solid temperatures and substantially reduces condensation on the solids of the water produced in the reaction, mitigating conglomeration of the product. This in turn prevents the major problem of removing this fused product and the need to crush or pulverize it. Fines created by pulverization also present serious disposal or sales problems which are not present in the instant invention since large particle-sized feed is possible and which sizing is essentially retained throughout the process. Pressure drop in the process is greatly reduced which reduces power and capital cost in compression equipment. Preheating solids and gas is minimized since the hot gases moving upwardly through the multiple true fluidized beds actively react with the incoming ambient feed and the warm exiting solids react with the incoming ambient gas which not being anhydrous actively reacts with any remaining unreacted solids. In addition the instant process also permits conversion of the solids to the respective halide in a single vessel saving significant capital investment.

SUMMARY OF THE INVENTION

The primary object of this invention is to eliminate the operating problems, inefficiencies and environmental deficiencies of the prior art by providing an improved process by which metal oxides, carbonates, bicarbonates and hydroxides may be reacted with hydrogen halides to produce solid compounds containing the halide while liberating water vapor and carbon dioxide depending on the original metal anions.

An object of the present invention is to provide a highly energy efficient process for said reactions by intimately contacting metal, carbonates, bicarbonates, oxides, and hydroxides in a series of conventional or true fluidized beds with reactive hydrogen halide gas in countercurrent flow.

Another object of the invention is to provide a simple, continuous and cost effective process for the manufacture of said compounds.

Another object of the invention is to provide the conditions by which the new process may be effectively performed to produce the said compounds.

Another object of the invention is to provide granular products consisting of approximately the same mesh size as the initial solids and which being of larger size have more commercial value.

Another object of the invention is to provide an economical and effective method to produce commercial grade metal halides with minimal environmental impact.

A final object of the invention is to provide an economical and cost effective method to produce commercial grade calcium chloride with little or no environmental impact.

The invention consists of certain novel claims and a combination of parts hereinafter fully described, illustrated in the accompanying drawings and particularly pointed out

DESCRIPTION OF THE PREFERRED EMBODIMENT

Figure 1:
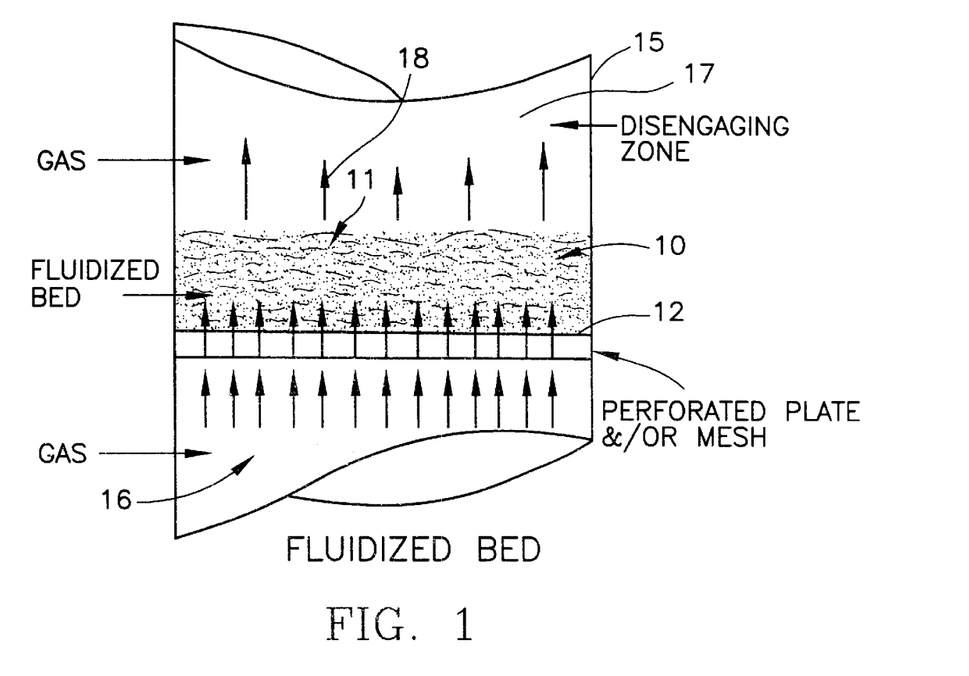
FIG. 1 is an elevational representation of a fluidized bed.

Referring now to FIG. 1, there is disclosed a fluidized bed 10 comprised of a plurality of particulates 11 suspended above a perforated plate 12 in a container 15. The container 15 is shown as a representation of a cylindrical pipe but may be of any desired shape. The container 15 is provided with an inlet gas 16 below the perforated plate 12 and a gas outlet 18 above a disengaging zone 17. The disengaging zone 17 is the area above the perforated plate 12 necessary for any particulates entrained in the gas flowing through the perforated plate 12 to fall back into the fluidized bed 10. Flow from each plate to the next lower plate will be conveyed either internally or externally and sealed by the solids in the lower plate, or by mechanical means so as to prevent gas bypass.

A fluidized bed, as defined in Kearns ed., McGraw Hill 1976, is defined as solid particles kept in a randomly moving, suspended and moderately agitated condition by a stream of pressurized gas distributed through the bed so that the particles flow in a manner similar to a gently boiling liquid. This is usually accomplished by placing the particles on a perforated plate and a pressurized gas is forced through the perforations in the plate and the gas causes the particles to fluidize. True fluidized bed technology is well known in the art, and as previously outlined is employed in the inventive process.

Figure 2:
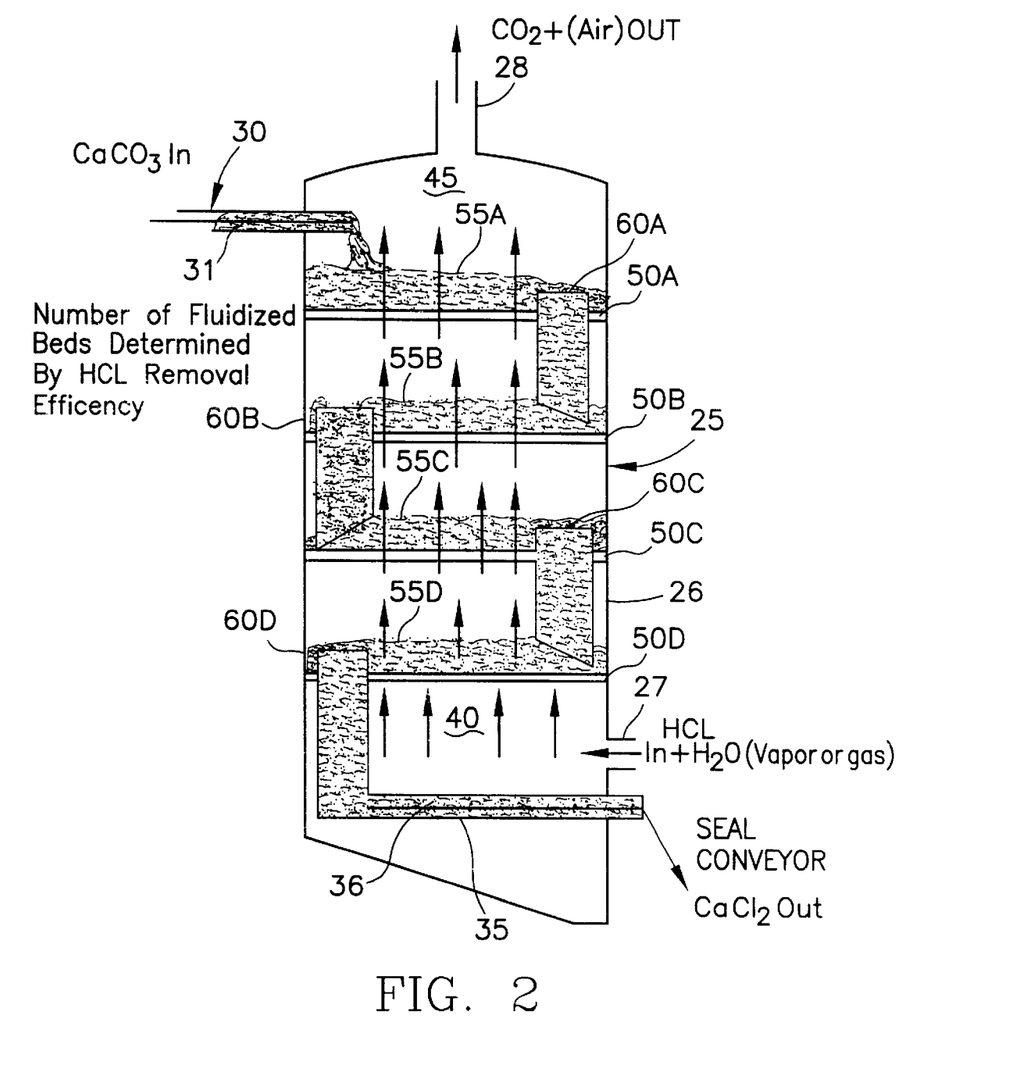
FIG. 2 is a side elevational view of fluidized beds arranged in vertical configuration.

Referring now to FIG. 2, there is another embodiment of the present invention in which a plurality of beds is arranged in vertical configuration. More particularly, a reactor 25 includes a cylindrical vessel 26 having a gas inlet 27 and a gas outlet 28. A particulate inlet conduit 30 houses an inlet screw mechanism 31 and a particulate outlet 35 houses a product screw mechanism 36. The particulate inlet conduit 30 is positioned near the top of the reactor 25 and the particulate outlet conduit 35 is positioned near the bottom of the reactor 25.

The reactor 25 includes a gas plenum 40 in communication with the gas inlet 27 and an exhaust gas plenum 45 in communication with the gas outlet 28. There are a plurality of perforated plates 50A, 50B, 50C and 50D, each of which support a corresponding fluidized bed 55A, 55B, 55C, 55D thereupon comprising a plurality of particulates in a state of fluidization due to the gas entering through the gas inlet 27 and distributed through the hot gas plenum 40 and thereafter through the individual perforated plates, as shown in FIG. 2. Each of the fluidized beds 55A through D is provided with a particulate overflow conduit 60A–D that communicates particulates from each of the fluidized beds to the next adjacent downwardly positioned bed and which maintains the level of particulates on the plate. For instance, conduit 60A communicates particulates from bed 55A to bed 55B and conduit 60B provides communication of particulates from bed 55B to 55C and so on. The particulate overflow conduit 60D provides communication between the bed 55D and the particulate outlet conduit 35. While the reactor 25 includes internal overflow conduits 60A–D, external conduits can also be employed. Gas bypass is prevented by sealing the conduit below the level of solids in the next lower plate.

As will be hereinafter described hydrogen chloride gas is introduced through the inlet 27 and flows upwardly at a sufficient pressure to fluidize the beds 55D through 55A. As may be understood, the hydrogen chloride concentration in the inlet gas is at its highest value since chemical reactions in each bed with calcium carbonate particulates reduces the concentration of hydrogen chloride and increases the concentration of carbon dioxide in the gas while increasing the concentration of chloride in the particulates until the upper most bed 55A, the concentration of the hydrogen chloride in the exhaust gas plenum 45 is substantially reduced to low enough levels such that it may be exhausted to the atmosphere without any further treatment or at the most very little treatment or sufficient treatment to recover the carbon dioxide gas if that is desired while the chloride concentration in the bed 55D is at the greatest as most if not all of the carbonate has been converted to the corresponding chloride.

Although the figure shows the use of calcium carbonate flowing into the bed 55A through the particulate inlet 30 and calcium chloride flowing out of the bed 55D through the particulate outlet conduit 35, this is for purposes of illustration only. It should be understood that the halides may be any one or a mixture of chlorine, bromine or fluorine and the metal may be any one of calcium, magnesium, or mixtures thereof and sodium, zinc, iron or commercial limestone, or other naturally occurring compounds of the metal indicated.

Since both carbonates and bicarbonates produce carbon dioxide when reacted with hydrogen halides it may be necessary to recycle a small percentage of the effluent gas by means of a blower to insure maintenance of fluidization since the carbon dioxide may be recovered and dilution with air is undesirable. If however the solid particulates are metal oxides, air will be required to maintain fluidization in the upper plates as the hydrogen halides are depleted.

Figure 3:
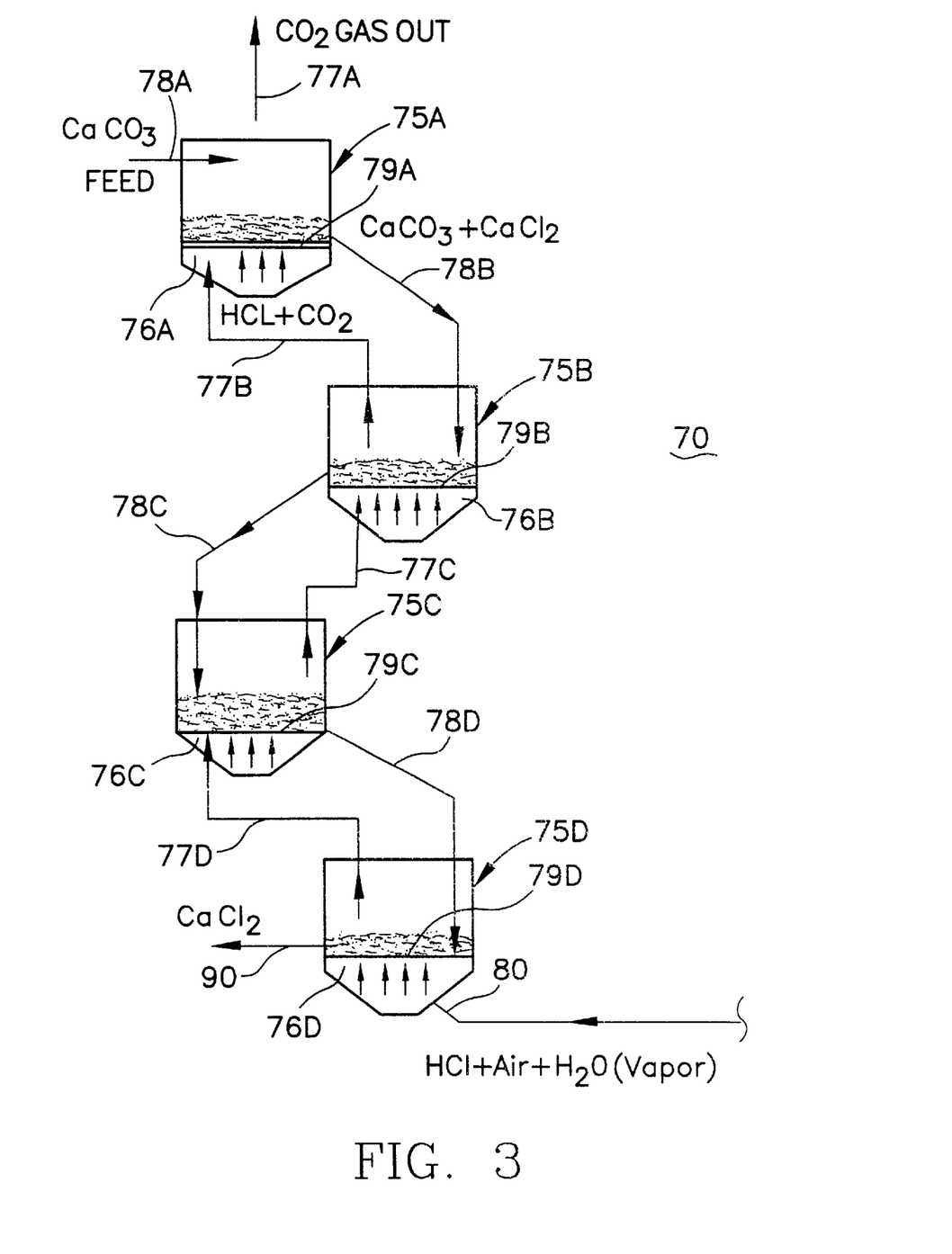
FIG. 3 is a schematic representation of a number of fluidized beds arranged in series connection.

Referring now to FIG. 3, there is shown in diagrammatic representation, a system 70 comprised of a plurality of reactors 75A, 75B, 75C and 75D, each connected by gas and particulate conduits as will be described. More particularly, there is provided in each reactor 75A–D a corresponding gas inlet plenum 76A–D, a gas outlet plenum 77A–D and solids inlet 78A–D. The flow of materials is the same for system 70 as previously described with respect to the reactor 25 but in the system 70, there are a number of discrete reactors rather than a single vessel as previously described.

More particularly, the system 70 includes a gas inlet 80 in communication with the gas inlet plenum 76D of reactor 75D. The gas inlet 80 is in communication with a source of hydrogen chloride gas and in those reactions where no carbon dioxide is produced with a source of air 83. Recycle of a small percentage of the effluent gas may be required when the feed solid is a carbonate or bicarbonate. The recycle gas if required is compressed by a blower and combined with the hydrogen chloride gas through the gas inlet conduit 80 to the plenum 76D for flow through the various perforated plates 79A–D in each of the reactors to form the corresponding fluidized bed in each of the reactors 75A–D. The product outlet 90 removes the formed calcium chloride from the reactor 75D whereas the gas outlet 77A conducts the carbon dioxide gas or water vapor out of the endmost reactor.

It is also possible to employ a horizontal vessel with a series of discrete fluidized bed compartments to accomplish the reaction since the fluidization of the beds will permit counter current flow of gas and solids.

As can be seen therefore, there are a variety of apparatus and systems which can accommodate the present reaction but in all cases, it is necessary to employ true conventional fluidization and to have the particulates flow countercurrent to the fluidizing gas and for the concentration of hydrogen halide to diminish as the gas flows through successive beds while the concentration of metal halides increases as particulates flow in countercurrent relationship to the gas flow.

The present invention is directed to a method of producing calcium chloride salts for commercial use. The invention is based on the reaction of hydrogen halide gases in contact with metal carbonate, bicarbonate, oxides in shallow beds maintained in a conventional or true fluidized state so as to rapidly convert without significant particle size degradation the solid particulates to solid compounds consisting of the anion of the metal and the halide while liberating water vapor and or carbon dioxide in certain instances. By shallow beds is meant a bed having a depth of about one to four feet. This new method allows a heretofore-unknown energy, cost efficient and continuous method for producing said compounds.

The instant method consists of contacting calcium carbonate or limestone with hydrogen chloride gas at a moderately elevated temperature in a series of shallow fluidized beds. Conversion of 97% to 100% calcium chloride is achieved in a very short period of time, i.e. from several minutes to one to two hours depending on the temperature of the gas and fluidized solids and concentration of hydrogen chloride in the gas, with the liberation of water vapor and or carbon dioxide in certain instances. Having described the basic concepts of the instant invention reference is made to the following example, which is provided to illustrate but not limit the preferred method of the invention and other similar methods of producing metal chlorides.

The preferred embodiment of the instant invention is to introduce hydrogen chloride gas, preferably at a temperature in the range of 200° F. to 800° F. into a series of shallow beds, one to four feet deep, of a metal carbonate or oxide such as zinc oxide. The hydrogen chloride is preferably produced as a byproduct of a commercial operation such as the production of chlorofluorocarbons, chlorine, or chlorohydrocarbons. It is apparent that with proper reactor design as is known to one skilled in the art, variable bed depths as previously described, counter current gas and solid flow and true fluidization, continuous production rates of ten or more tons per hour can be maintained even though residence time of solids in the reactor may be as much as two hours.

The apparatus may consist of a vertical column containing a number of perforated plates, connected to each other either by internal or external sealed overflows. The hydrochloric acid gases and possibly water vapor are fed into the bottom of the column below the bottom-perforated plate. Solid metal carbonate is introduced on a continuous basis into the top plate. The depth of the bed is controlled by the height of the overflow above the perforated plate. The solids because of true fluidization behave like a liquid and flow down the overflows into the next lower plate, which is sealed to prevent gas up flow by the solids in the overflow connection and in the lower bed. The process continues plate by plate until the solids reach the last plate from which they flow into a seal conveyor. At each plate gas and solids are intimately contacted due to the boiling action caused by the fluidization of the solids. Heat exchange between solid and gas is exceptionally efficient due to this contact in which the reaction process proceeds and reaction heat is liberated. A head differential exists between the inlet and exit location at each plate resulting in the flow of the solids from inlet to exit. The maximum concentration differential between the chloride in the solids and the hydrochloric acid gas is maintained in each plate as the solids flow down the reactor, and the gas proceeds upward. This is due to the depletion of the hydrochloric acid in the gas stream as it reacts with the metal carbonates, bicarbonates, or oxides which are converted to chlorides. At the bottom plate the maximum hydrochloric acid gas concentration contacts a solid totally or almost totally converted to the chloride.

The high concentration hydrochloric acid gas results in conversion of the remaining metal carbonate or oxide to metal chloride. At the top several plates gas almost depleted of hydrochloric acid contacts pure metal carbonates and leaves the reactor depleted of hydrochloric acid. Carbon dioxide gas if produced in the sequential fluidized reaction zones leaves the reaction column and is recovered or vented to atmosphere.

While there has been disclosed what is considered to be the preferred embodiment of the present invention, it is understood that various changes in the details may be made without departing from the spirit, or sacrificing any of the advantages of the present invention.

We claim:

1. A process for converting particulates of at least one selected from the group consisting of carbonates, bicarbonates, and oxides of a metal to corresponding halides, which is effective in the presence of air, comprising contacting the particulates with a fluidizing hydrogen halide gas at a velocity sufficient to form a true fluidized bed of the particulates, maintaining the true fluidized bed at a temperature in the range of from about 250° F. to about 800° F. for a time sufficient to permit the particulates to be converted to the corresponding halides while producing an effluent gas.

2. The process of claim 1, wherein the fluidizing hydrogen halide gas is selected from the group consisting of hydrogen chloride, hydrogen fluoride, hydrogen bromide and mixtures thereof.

3. The process of claim 1, wherein the metal is selected from the group consisting of sodium, calcium, magnesium, zinc, iron, and mixtures thereof.

4. The process of claim 1, wherein the particulates are selected from the group consisting of magnesite, dolomite, naturally occurring compounds of calcium, magnesium, zinc and iron, and mixtures thereof.

5. The process of claim 1, where a percentage of the effluent gas includes carbon dioxide and is recycled to sustain fluidization.

6. The process of claim 5, where the effluent gas contains carbon dioxide gas and is recovered.

7. The process of claim 1, where air is added to the fluidizing hydrogen halide gas or added separately to sustain fluidization.

8. The process of claim 1, wherein the true fluidized bed has a depth in a range of from about 12 inches to about four feet.

9. The process of claim 1, wherein the fluidizing hydrogen halide gas is maintained in contact with the particulates for a time sufficient to remove substantially all hydrogen halide from the effluent gas.

10. A process for converting particulates of at least one selected from the group consisting of carbonates, bicarbonates, oxides and hydroxides of a metal selected from the group consisting of alkali metals, alkaline metal earths, transition metals and mixtures thereof to corresponding halides, comprising establishing a series of fluidized beds of the particulates by passing a fluidizing gas containing hydrogen halide and air or recycled carbon dioxide through the particulates at a velocity sufficient to establish and maintain the particulates in a fluidized bed, the fluidizing gas leaving one fluidized bed and flowing through another fluidized bed in the series of fluidized beds until the fluidizing gas leaving the last fluidized bed in the series of fluidized beds is substantially free of hydrogen halide and the particulates leaving the first fluidized bed in the series of fluidized beds being substantially free of carbonates, bicarbonates, oxides or hydroxides.

11. The process of claim 10, wherein the fluidizing gas moves countercurrent to the direction of the particulates.

12. The process of claim 10, wherein the metal is selected from the group consisting of calcium, sodium, magnesium, zinc, iron, and mixtures thereof and the hydrogen halide is selected from the group consisting of hydrogen chloride, hydrogen fluoride, hydrogen bromide and mixtures thereof.

13. The process of claim 10, wherein the particulates are selected from the group consisting of limestone, magnesite, dolomite, naturally occurring compounds of calcium, magnesium, zinc and iron, and mixtures thereof.

14. The process of claim 10, where a percentage of the fluidizing gas leaving the last bed is carbon dioxide gas and is recycled to sustain fluidization.

15. The process of claim 14, where the carbon dioxide gas is recovered.

16. The process of claim 10, where air is added to the fluidized gas to sustain fluidization.

17. The process of claim 10, wherein each fluidized bed of the series of fluidized beds has a depth in a range of from about 12 inches to about four feet.

18. The process of claim 10, wherein the series of fluidized beds are in a single vessel vertically arranged such that particulates from one fluidized bed falls into a lower fluidized bed and gas exiting from a lower fluidized bed flows through a higher fluidized bed.

19. The process of claim 10, wherein the series of fluidized beds are vertically arranged such that particulates flow downwardly counter currently to the fluidizing gas flowing upwardly and particulates with a highest content of carbonates, bicarbonates, oxides or hydroxides are contacted with fluidizing gas having a lowest hydrogen halides content.

20. The process of claim 10, wherein the halide of the hydrogen halide is chloride and the metal is calcium.

* * * * *

UNITED STATES PATENT AND TRADEMARK OFFICE
CERTIFICATE OF CORRECTION

PATENT NO.    : 6,524,546 B2
DATED         : February 25, 2003
INVENTOR(S)   : William J. Rigby et al.

It is certified that error appears in the above-identified patent and that said Letters Patent is hereby corrected as shown below:

<u>Title page,</u>
Item [73], Assignee, delete "Willaim J. Rigbv" and insert -- William J. Rigby --.

<u>Column 10,</u>
Line 48, after the word "zinc" insert -- , --.
Line 48, delete the word "and" first occurrence.

Signed and Sealed this

Ninth Day of September, 2003

JAMES E. ROGAN
*Director of the United States Patent and Trademark Office*